(12) United States Patent
Vallery

(10) Patent No.: US 7,931,046 B1
(45) Date of Patent: Apr. 26, 2011

(54) STEAM TRAP WITH INVERTED BUCKET FLOAT

(76) Inventor: Stafford J. Vallery, Port Salerno, FL (US)

(*) Notice: Subject to any disclaimer, the term of this patent is extended or adjusted under 35 U.S.C. 154(b) by 0 days.

(21) Appl. No.: 12/694,461

(22) Filed: Jan. 27, 2010

(51) Int. Cl.
*F16T 1/30* (2006.01)
(52) U.S. Cl. ........................................ 137/185; 137/429
(58) Field of Classification Search .......... 137/185–194, 137/202, 429, 432, 433, 401; 55/410, 417
See application file for complete search history.

(56) References Cited

U.S. PATENT DOCUMENTS

| | | | |
|---|---|---|---|
| 367,851 A * | 8/1887 | Royle | 137/186 |
| 1,039,621 A * | 9/1912 | Westcott | 137/192 |
| 1,163,316 A * | 12/1915 | Brown | 137/192 |
| 1,543,312 A | 6/1925 | Armstrong | |
| 1,704,398 A * | 3/1929 | Merrihew | 137/190 |
| 1,766,970 A | 6/1930 | Armstrong | |
| 1,787,465 A | 1/1931 | Armstrong | |
| 1,838,089 A * | 12/1931 | Baker | 137/185 |
| 1,856,451 A | 5/1932 | Armstrong | |
| 1,897,753 A | 2/1933 | Cryer | |
| 1,904,393 A | 4/1933 | Travis, Jr. | |
| 2,005,926 A | 6/1935 | Armstrong | |
| 2,013,015 A | 9/1935 | Vincent | |
| 2,157,470 A * | 5/1939 | Adlam | 137/185 |
| 2,760,596 A | 8/1956 | Kellie | |
| 2,892,294 A | 6/1959 | Armstrong | |
| 2,955,611 A * | 10/1960 | Shimizu | 137/185 |
| 3,489,164 A | 1/1970 | Fujiwara | |
| 3,489,348 A | 1/1970 | Fujiwara | |
| 3,776,255 A * | 12/1973 | Fujiwara | 137/202 |
| 3,785,555 A | 1/1974 | Fujiwara | |
| 3,842,856 A * | 10/1974 | Asfura | 137/185 |
| 3,892,256 A | 7/1975 | Schlesch | |
| 3,933,449 A | 1/1976 | Miselem | |
| 4,011,884 A | 3/1977 | Druri | |
| 4,014,362 A | 3/1977 | O'Neil et al. | |
| 4,073,306 A | 2/1978 | Neyer | |
| 4,149,557 A | 4/1979 | Keech et al. | |
| 4,168,029 A | 9/1979 | Mosher, Jr. | |
| 4,300,588 A | 11/1981 | Fujiwara et al. | |
| 4,387,733 A | 6/1983 | Balazs et al. | |
| 4,408,626 A | 10/1983 | Fujiwara | |
| 4,508,135 A * | 4/1985 | Schlesch et al. | 137/185 |
| 4,630,633 A | 12/1986 | Vallery | |
| 4,664,138 A | 5/1987 | Kline | |
| 5,065,785 A | 11/1991 | Deacon et al. | |
| 5,186,203 A | 2/1993 | Oike | |
| 5,287,878 A * | 2/1994 | Oike | 137/194 |
| 5,409,033 A * | 4/1995 | Hirayama | 137/202 |
| 5,947,145 A | 9/1999 | Schlesch et al. | |
| 7,096,880 B2 | 8/2006 | Aoki et al. | |

* cited by examiner (Continued)

*Primary Examiner* — Stephen M Hepperle
*Assistant Examiner* — Craig Price
(74) *Attorney, Agent, or Firm* — Dennis T. Griggs; Scott T. Griggs; Griggs Bergen LLP

(57) ABSTRACT

A steam trap includes an inverted bucket in a bucket chamber. The bucket has a vent hole formed in an upper portion thereof. The vent hole is formed along a vent hole axis, which may be angled so that the bucket rotates from the venting propulsion. The chamber has an outlet orifice formed in a sidewall thereof. There is a spaced vertical distance between the outlet orifice and an upper interior surface of the chamber. Preferably, the bucket is not attached to the chamber and configured to move vertically and horizontally in the bucket chamber, but not flip over. The bucket and the interior sidewalls of the chamber are configured so that the bucket can substantially cover the outlet orifice when the bucket is pulled against the interior sidewall at the location of the outlet orifice by a flow of fluid out of the outlet orifice.

20 Claims, 4 Drawing Sheets

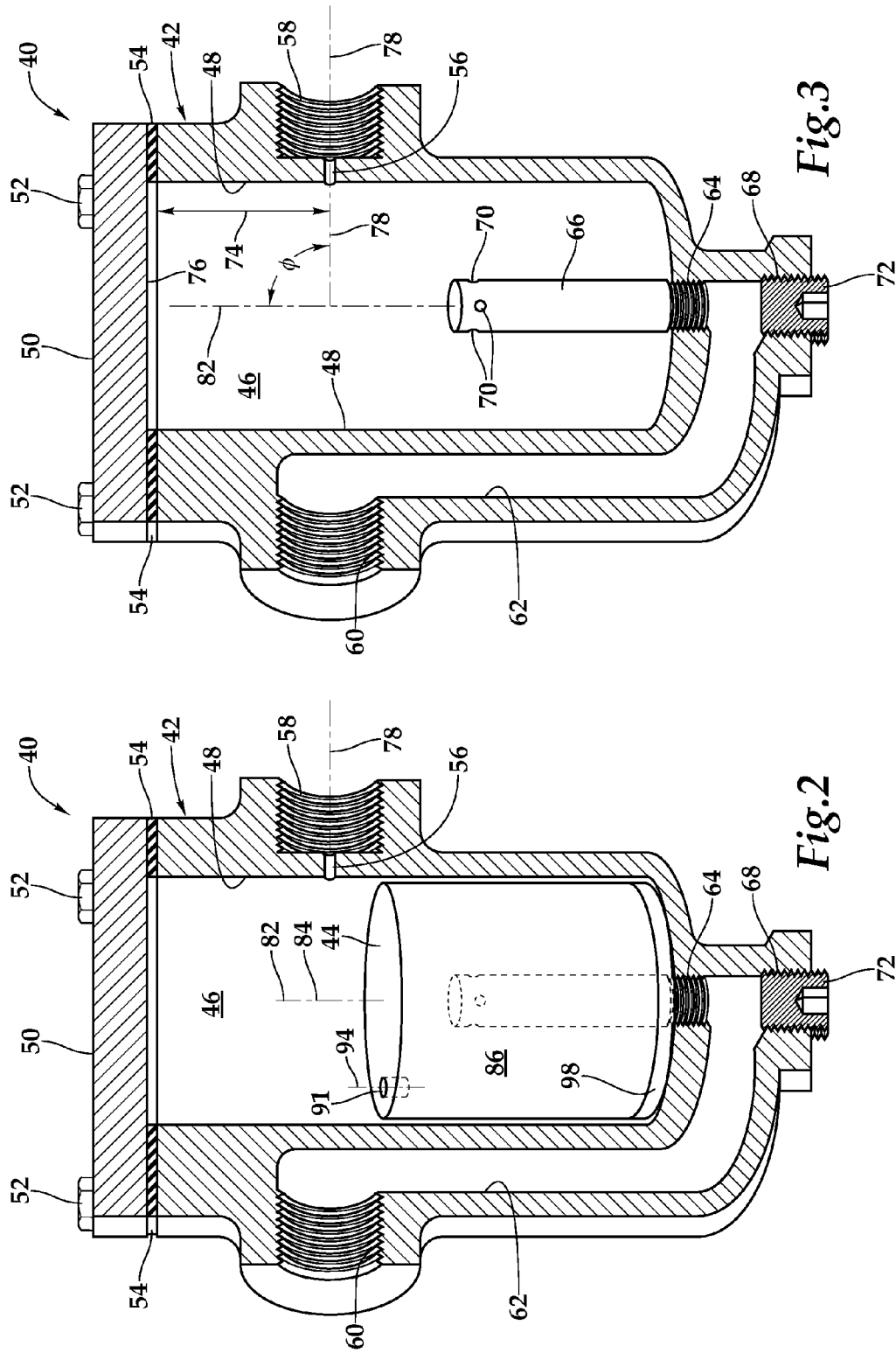

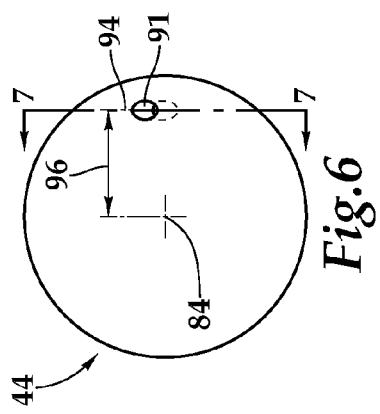
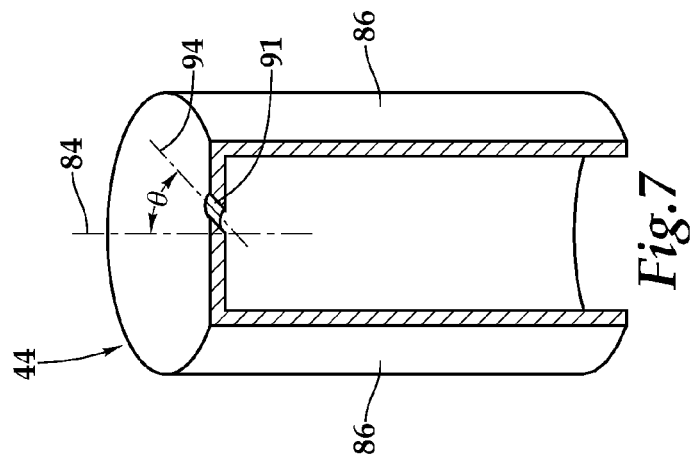
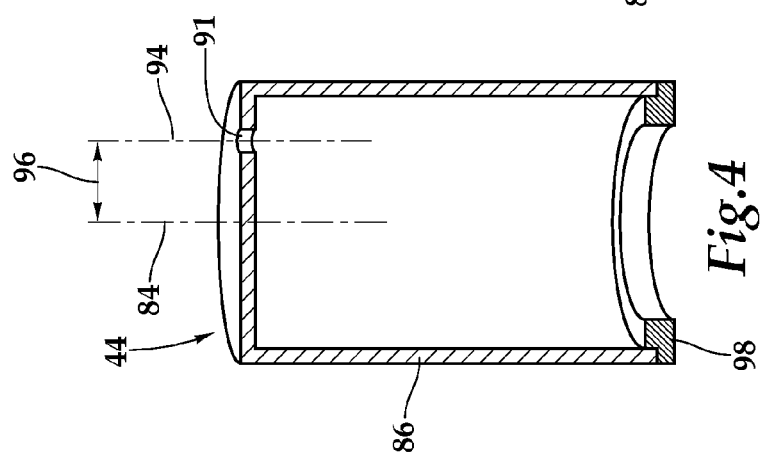
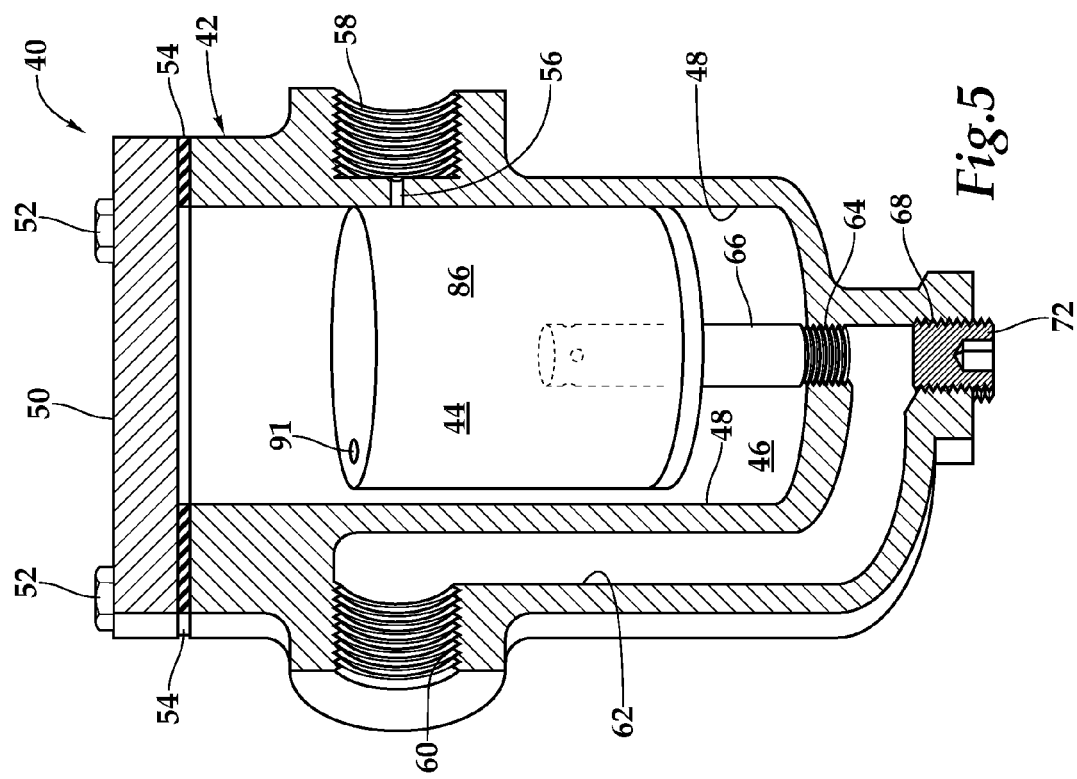

STEAM TRAP WITH INVERTED BUCKET FLOAT

TECHNICAL FIELD OF THE INVENTION

The present invention generally relates to steam system components and, more specifically, it relates to steam trap devices used in steam systems for removing condensation.

BACKGROUND OF THE INVENTION

Without limiting the scope of the present invention, its background will be described with reference to prior art FIG. 1, as an example. Steam is used for many applications, and most commonly for heating systems. Steam provides an efficient means for transmitting heat from one location to another. A simplified schematic for a typical steam heating system 20 is shown in FIG. 1. The steam system 20 includes a boiler 22 to create steam. Pipes 24 transfer steam from the boiler 22 to radiators 26, which may be mounted in different rooms of a building, for example. Valves 28 in the system 20 control the flow rate and/or pressure of the steam. And, more pipes 24 carry the uncondensed steam and condensate back to the boiler 22 to be reheated again. In a steam heating system, water condensate and non-condensable gases accumulate as some of the steam loses heat in the pipes when being transferred from the boiler to the radiators, and as heat is transferred from the steam to the atmosphere via the radiators. It is desirable to remove the condensate from the steam pipes, collect the condensate, and return it to the boiler.

During operation of a steam system, steam condenses and forms a thin film of condensation on the inner walls of the steam pipes and heat exchangers. Also, non-condensable gases that do not convert to liquid when cooled at the operating temperature range of the steam system accumulate as a thin film on the inner walls of the steam pipes and heat exchangers. It is undesirable to have the accumulation of condensation and non-condensable gases on the inner walls of heat exchangers (e.g., radiators) because it forms an insulating layer; thereby reducing the efficiency of the heat exchanger. Hence, it is desirable to remove the accumulation of condensation and non-condensable gases.

Typically the pipes of a steam system are positioned and mounted so that gravity will cause the flow of condensate to a collection and removal location. However, it is not always possible to layout the steam pipes in an optimum manner to allow gravity alone to cause all condensate to flow to a central collection and removal location (e.g., routing steam pipes through a commercial or residential building). If condensate is allowed to accumulate in pipes, it will eventually create larger puddles. Steam passing over the puddles will then cause waves in the puddles. As the waves become large enough, the water can form a slug of condensate in the pipe. Such slugs of condensate are then pushed through the pipe by the steam flow and pressure. When the accelerated slug encounters a change in direction of the pipe, a regulating valve, or a pump, it acts as a battering ram. The impact of such water slugs causes damage to pipes, fittings, valves, pumps, and other components of the steam system. Thus, it is desirable to prevent large accumulations of condensate in a steam system to prevent puddles and water slugs from forming.

The steam heating system 20 shown in FIG. 1 incorporates conventional steam traps 30 to remove condensate from the system at various locations. Generally, steam traps may be incorporated into low-pressure, medium-pressure, and high-pressure steam systems. As shown in FIG. 1 for example, steam traps 30 are positioned in the system separating main steam lines 24A from condensate return lines 24B. The steam traps 30 feed the condensate into return pipes 24B that carry the condensate back to the boiler 22. The main function of a steam trap is to remove condensate with minimal steam loss into the condensate return line.

Many conventional steam traps include a float coupled to a lever mechanism for opening and closing a discharge valve. Such lever mechanisms may have a limited life span and may be expensive and complex to manufacture in order to provide a reliable and functional steam trap. Some conventional steam traps have complex linkages and levers that are prone to sticking, clogging, and/or binding (e.g., when bent by forces of a water hammer). Other conventional steam traps eliminate the linkages and levers by providing a float that is unattached. But many of the steam traps having unattached floats require valve seats and complex chamber inner wall shapes, as well as complex float shapes, which are expensive and complex to manufacture. Hence, there is a need for a steam trap that is simple in its design to reduce the number of moving parts that may stick, clog, jam, or bind, while still providing reliable and consistent removal of condensate with minimal steam loss. One of the downsides in incorporating steam traps in a steam system is the added cost of the steam traps. Hence, there is also a need for a steam trap that is simple in its design to reduce manufacturing costs; thereby allowing for a less expensive steam trap and/or a more profitable steam trap.

SUMMARY OF THE INVENTION

The problems and needs outlined above may be addressed by embodiments of the present invention. In accordance with one implementation of the present invention, which will be summarized in this paragraph, a steam trap device is provided. The steam trap device includes an inverted bucket, a bucket chamber, an inlet orifice, and an outlet orifice. The inverted bucket preferably has a generally cylindrical shaped outer portion extending along a bucket axis. Preferably, the bucket axis extends along a vertical axis. The inverted bucket has a first vent hole formed in an upper portion thereof. The first vent hole is formed along a first vent hole axis. The bucket chamber has an outlet orifice formed in a sidewall thereof. There is a spaced vertical distance between the outlet orifice and an upper interior surface of the bucket chamber. The inverted bucket is located within the bucket chamber so that the inverted bucket is free to move along the bucket axis within a vertical range of motion limited by the inverted bucket coming into contact with at least one interior surface of the bucket chamber. At least part of the interior sidewalls of the bucket chamber is generally cylindrical shaped. The inverted bucket is free to pivot about the bucket axis within the bucket chamber. The inverted bucket can move along a horizontal axis within a horizontal range of motion limited by the inverted bucket coming into contact with at least one sidewall interior surface of the bucket chamber. The inverted bucket and the interior sidewalls of the bucket chamber are configured so that the inverted bucket is adapted to at least partially cover the outlet orifice when the inverted bucket is pulled against the interior sidewall of the bucket chamber at the location of the outlet orifice by a flow of fluid out of the outlet orifice. The bucket chamber has an inlet orifice formed in a lower portion thereof.

This paragraph describes some illustrative variations upon the implementation described in the immediately preceding paragraph. A first vent hole angle between the first vent hole axis and a vertical plane that intersects the bucket axis may be at least 10 degrees. The first vent hole angle may be in a range between 10 degrees and 70 degrees. The bucket axis may be vertical, the first vent hole may be formed in a top surface of the inverted bucket, and the first vent hole axis may be parallel with the bucket axis. The outlet orifice may be formed along an outlet orifice axis, such that an outlet orifice angle between the outlet orifice axis and a plane through a vertical axis is between about 45 degrees and about 135 degrees. The outlet orifice angle may be about 90 degrees in a preferred embodiment. The inverted bucket may not be attached to the bucket chamber. Alternatively, the inverted bucket may be tethered to an interior wall of the bucket chamber to limit its range of motion.

The inverted bucket may have a central body portion with a circular cross-section having a first diameter extending uniformly along the vertical axis, and at least part of interior sidewalls of the bucket chamber may be generally cylindrical shaped with a second diameter, with the second diameter being greater than the first diameter. The steam trap device may further include a metal cast casing and an inlet pipe. In such case, the metal cast casing may include the bucket chamber, the outlet orifice, the inlet orifice, and an inlet passage extending downwardly to the inlet orifice, such that the inlet passage is fluidly coupled to the bucket chamber at least via the inlet orifice. In a preferred embodiment, the bucket chamber, the outlet orifice, the inlet orifice, the inlet passage are integrally cast in the casing. The inlet pipe may extend into the bucket chamber from the lower portion of the bucket chamber so that the inlet pipe is located at least partially in the inverted bucket when the inverted bucket is at a lowest extent of the vertical range of motion, and so that the bucket chamber is fluidly coupled to the inlet orifice at least via the inlet pipe.

The inverted bucket may have a generally flat upper surface. The first vent hole may be formed in a top surface of the inverted bucket. The first vent hole may be formed in a side surface or corner of the inverted bucket proximate to the top surface. The spaced vertical distance to the outlet orifice may be in a range between about 5 percent and about 35 percent of an overall height of the bucket chamber. The inverted bucket may include a mouthpiece ring portion at the opening of the inverted bucket. The inverted bucket may include a second vent hole formed therein opposite the first vent hole about the bucket axis. The inverted bucket may include numerous vent holes. The bucket chamber may be generally cylindrical shaped.

In accordance with another implementation of the present invention, which will be summarized in this paragraph, a steam trap device is provided. The steam trap device includes a bucket chamber and an inverted bucket with an angled vent hole formed therein. The inverted bucket has a generally cylindrical shaped outer portion extending along a bucket axis. The inverted bucket has a first vent hole formed in an upper portion thereof. The first vent hole is formed along a first vent hole axis. A first vent hole angle between the first vent hole axis and a vertical plane that intersects the bucket axis is at least 10 degrees. The bucket chamber has an outlet orifice formed in a sidewall thereof. There is a spaced vertical distance between the outlet orifice and an upper interior surface of the bucket chamber. The inverted bucket is located within the bucket chamber. The inverted bucket is free to move along the bucket axis within a vertical range of motion limited by the inverted bucket coming into contact with at least one interior surface of the bucket chamber. At least part of interior sidewalls of the bucket chamber are generally cylindrical shaped. The inverted bucket is free to rotate about the bucket axis within the bucket chamber. The inverted bucket can move along a horizontal axis within a horizontal range of motion limited by the inverted bucket coming into contact with at least one sidewall interior surface of the bucket chamber. The inverted bucket and the interior sidewalls of the bucket chamber are configured so that the inverted bucket is adapted to cover the outlet orifice when the inverted bucket is pulled against the interior sidewall of the bucket chamber at the location of the outlet orifice by a flow of fluid out of the outlet orifice. The bucket chamber has an inlet orifice formed in a lower portion thereof. The first vent hole angle may be about 45 degrees in a preferred embodiment. The inverted bucket may include a second vent hole formed therein opposite the first vent hole about the bucket axis. The inverted bucket may include numerous vent holes.

In accordance with yet another implementation of the present invention, which will be summarized in this paragraph, a steam trap device is provided. The steam trap device includes an inverted bucket, a bucket chamber, an inlet passage, and an inlet pipe. The inverted bucket has a generally cylindrical shape extending along a vertical axis. The inverted bucket has a central body portion with a circular cross section with a first diameter extending uniformly along the vertical axis. The inverted bucket has a first vent hole formed in an upper portion thereof. The first vent hole is formed along a first vent hole axis. A first vent hole angle between the first vent hole axis and a vertical plane that intersects the vertical axis is at least 10 degrees. A bucket chamber has a generally cylindrical interior shape. The bucket chamber has an outlet orifice formed in a sidewall thereof. There is a spaced vertical distance between the outlet orifice and an upper interior surface of the bucket chamber.

The outlet orifice is formed along an outlet orifice axis. An outlet orifice angle between the outlet orifice axis and the vertical plane is between about 45 degrees and about 135 degrees. The inverted bucket is located within the bucket chamber but is not attached to the bucket chamber. The inverted bucket is free to move along the vertical axis within a vertical range of motion limited by the inverted bucket coming into contact with at least one interior surface of the bucket chamber. At least part of the interior sidewalls of the bucket chamber are generally cylindrical shaped with a second diameter. The inverted bucket is free to rotate about the vertical axis within the bucket chamber through a vertical distance range. The second diameter is greater than the first diameter such that the inverted bucket can move along a horizontal axis within a horizontal range of motion limited by the inverted bucket coming into contact with at least one sidewall interior surface of the bucket chamber.

The inverted bucket and the interior sidewalls of the bucket chamber are configured so that the inverted bucket is adapted to substantially cover the outlet orifice when the inverted bucket is pulled against the interior sidewall of the bucket chamber at the location of the outlet orifice by a flow of fluid out of the outlet orifice. The bucket chamber has an inlet orifice formed in a lower portion thereof. An inlet passage extends downwardly to the inlet orifice. The inlet passage is fluidly coupled to the bucket chamber at least via the inlet orifice. An inlet pipe extends into the bucket chamber from the lower portion of the bucket chamber. The inlet pipe is located at least partially in the inverted bucket when the inverted bucket is at a lowest extent of the vertical range of motion. The bucket chamber is fluidly coupled to the inlet orifice at least via the inlet pipe.

The foregoing has outlined rather broadly features of particular embodiments in order that the detailed description of the invention that follows may be better understood. Additional embodiments and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2 is a cut-away perspective view of a first steam trap embodiment according to the present invention;

FIG. 3 is another cut-away perspective view of the steam trap of the first embodiment with the inverted bucket removed;

FIG. 4 is a cross-section view of the inverted bucket of the first embodiment;

FIG. 5 is another cut-away perspective view of the steam trap of the first embodiment with the inverted bucket in an elevated position while being pulled against and covering the outlet orifice;

FIG. 6 is shows an inverted bucket of a second embodiment of the present invention;

FIG. 7 is a cross-section view of the inverted bucket of FIG. 6, as taken along line 7-7;

DETAILED DESCRIPTION OF THE INVENTION

Figure 1:
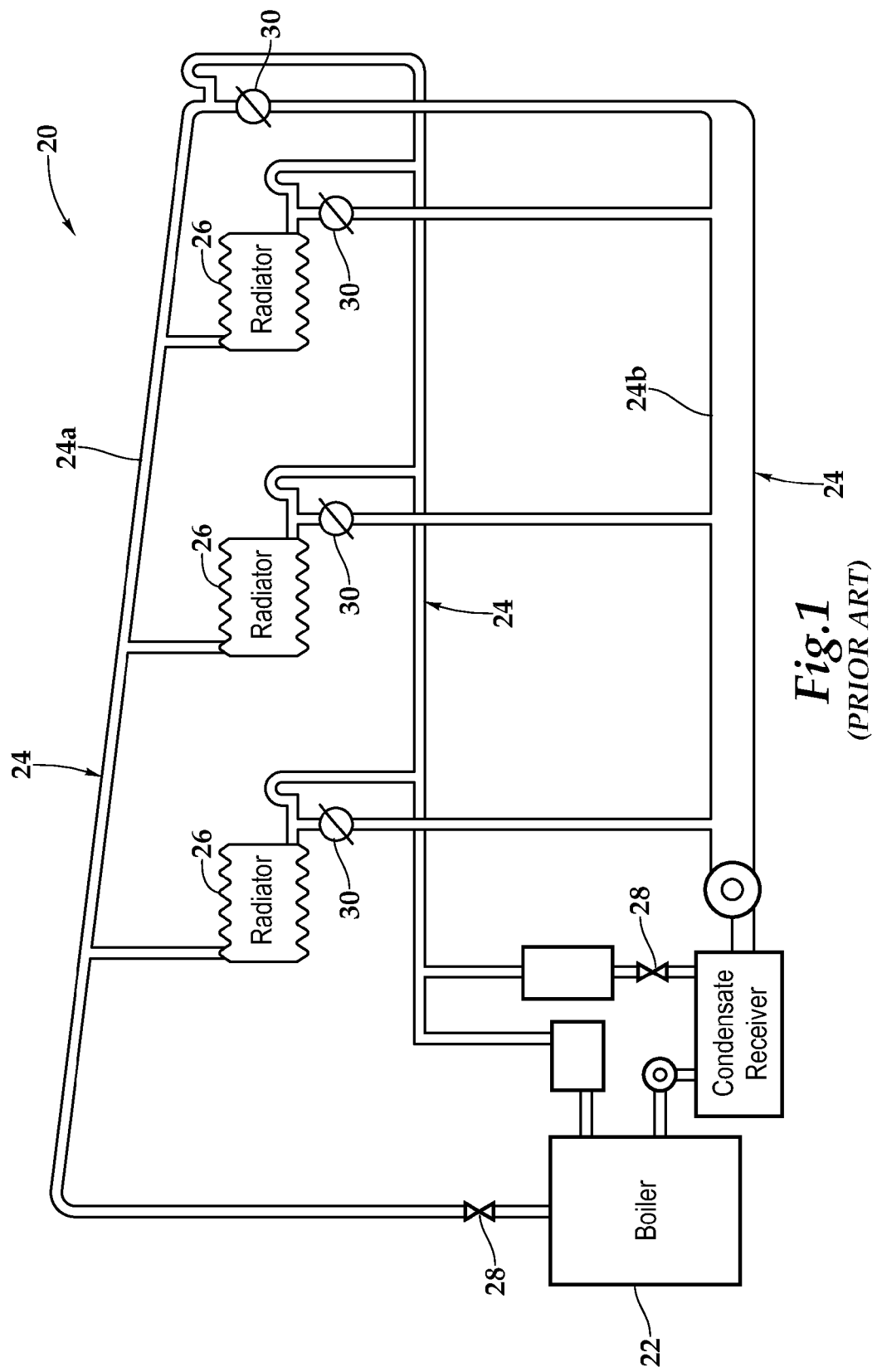
FIG. 1 is a prior art schematic of a conventional steam heating system that incorporates steam traps.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Embodiments of the present invention generally relate to inverted bucket steam traps used in steam systems. Generally, steam traps are used to remove condensate from steam lines with negligible or only small amounts of steam loss. FIGS. 2-5 illustrate a first embodiment of the present invention, which will be discussed first.

FIG. 2 is a cut-away perspective view of the first embodiment of a steam trap 40 according to the present invention. The steam trap 40 has two main components: a casing 42 and an inverted bucket 44. The steam trap 40 of the first embodiment has a metal cast casing 42 with a bucket chamber 46 formed therein. The bucket chamber 46 has a generally cylindrical interior shape. The bucket chamber 46 is integrally formed in the casing 42. Preferably, the bucket chamber 46 has a circular cross-section that extends uniformly along a vertical axis to form the sidewalls 48. Preferably, the sidewalls 48 of the bucket chamber are smooth (e.g., by machining or boring after the casing is cast), although it is not necessary. The casing 42 has a casing top 50 that is attached by bolts 52 and sealed by a gasket 54. Part of the casing top 50 forms an upper inner surface of the bucket chamber 46.

The casing 42 of the first embodiment also has integrally formed therein an outlet orifice 56, a threaded outlet port 58, a threaded inlet port 60, an inlet passage 62, an inlet orifice 64, an inlet pipe 66, and a threaded drain port 68. The threaded portions may be formed or finished after the casing 42 is cast. The inlet orifice 64 is formed in a lower portion of the bucket chamber 46. The inlet passage 62 extends downwardly from the inlet port 60 to the inlet orifice 64. During typical use of the steam trap 40, a steam line (not shown) will be threaded into the inlet port 60 to feed condensate, non-condensable gases, and steam to the steam trap 40. The inlet port 60 is fluidly coupled to the bucket chamber 46 via the inlet passage 62 and the inlet orifice 64. In FIG. 3, the inverted bucket 44 is removed from the bucket chamber 46 to show the inlet pipe 66. As shown in FIG. 3, the inlet pipe 66 is threadedly attached to the inlet orifice 64 and extends upwardly into the bucket chamber 46. The inlet pipe 66 has a series of holes 70 formed at an upper portion thereof. The bucket chamber 46 is fluidly coupled to the inlet passage 62 via the holes 70 in the inlet pipe, via the inlet pipe 66, and via the inlet orifice 64. As shown in FIG. 2, the inlet pipe 66 is located at least partially in the inverted bucket 44 when the inverted bucket is at a lowest extent of its vertical range of motion. During operation of the stream trap 40, condensate (not shown), enters the inlet port 60 from a steam line (not shown), the condensate travels down the inlet passage 62, through the inlet orifice 64, through the inlet pipe 66 (see, e.g., FIG. 3), and out the holes 70 formed in the inlet pipe 66 into the bucket chamber 46 (and into the interior of the inverted bucket 44, see e.g., FIG. 2).

As shown in FIGS. 2 and 3, a plug 72 is threaded into the drain port 68. As shown in FIG. 3, the bucket chamber 46 has an outlet orifice 56 formed in a sidewall 48 thereof. There is a spaced vertical distance 74 between the outlet orifice 56 and an upper interior surface 76 of the bucket chamber 46. It is preferable for the outlet orifice 56 to be located at an upper portion of the bucket chamber 46 for better operation of the steam trap 40. In a preferred embodiment, the spaced vertical distance 74 is in a range between about 5 percent and about 35 percent of an overall height of the bucket chamber 46, for example. The outlet orifice 56 is formed along an outlet orifice axis 78. An outlet orifice angle φ between the outlet orifice axis 78 and a vertical axis 82 may be between about 45 degrees and about 135 degrees, for example. In the first embodiment shown, the outlet orifice angle φ is about 90 degrees. During typical use in a steam system, a condensate return line (not shown) will be threaded into the outlet port 58 for discharging condensate from the stream trap 40. The outlet port 58 is fluidly coupled to the bucket chamber 46 via the outlet orifice 56.

Referring now to FIGS. 2 and 4, the inverted bucket 44 has a generally cylindrical exterior shape extending along a bucket axis 84. In the first embodiment, the bucket axis 84 is parallel with, or at times aligned with, the vertical axis 82 of the bucket chamber 46. The inverted bucket 44 of the first embodiment has a central body portion with a circular cross-section having a first diameter extending uniformly along the bucket axis 84. The inverted bucket 44 has a vent hole 91 formed in an upper portion thereof. The vent hole 91 is formed along a vent hole axis 94. In the first embodiment, the vent hole axis 94 is parallel with the bucket axis 84, for example.

The inverted bucket 44 is located within the bucket chamber 46 but is not attached to the bucket chamber 46. The inverted bucket 44 is free to move along the vertical axis 82 within a vertical range of motion limited by the inverted bucket 44 coming into contact with at least one interior surface of the bucket chamber 46. At least part of interior sidewalls 48 of the bucket chamber 46 are generally cylindrical shaped with a second diameter. The inverted bucket 44 is free to rotate about the bucket axis 84 within the bucket chamber 46 through a vertical distance range. The second diameter is greater than the first diameter so that the inverted bucket 44 can move along a horizontal axis within a horizontal range of motion limited by the inverted bucket 44 coming into contact with at least one sidewall interior surface of the bucket chamber 46. As shown in FIG. 5 and as will be explained further below, the inverted bucket 44 and the interior sidewalls 48 of the bucket chamber 46 are configured so that the inverted bucket 44 is adapted to at least partially cover, substantially cover, or even completely cover and block, the outlet orifice 56 when the inverted bucket 44 is pulled against the interior sidewall 48 of the bucket chamber 46 at the location of the outlet orifice 56.

FIG. 4 is a cross-section view of the inverted bucket 44 of the first embodiment. The inverted bucket 44 of the first embodiment has a generally flat upper surface. In other embodiments, the shape of the inverted bucket 44 may vary. The vent hole 91 is formed in a top surface of the inverted bucket 44. The vent hole 91 is located at a horizontal spaced distance 96 from the bucket axis 84. In other embodiments, the horizontal spaced distance 96 may be lesser or greater than that of the first embodiment. For example, the vent hole 91 may be at the center aligned with the bucket axis 84, and at another extreme, the vent hole 91 may be located at a top corner or even on an upper portion of the inverted bucket sidewall. The inverted bucket 44 of the first embodiment includes an optional mouthpiece ring portion 98 at the opening of the inverted bucket 44. For a given set of size, flow rate, and pressure parameters of a steam trap, the vent hole size, the outlet orifice size, and the weight of the mouthpiece ring (if needed), may be varied to balance and tune the design of the steam trap 40. For example, the size of the vent hole 91 and the weight of the mouthpiece ring 98, at least in part, control the rise rate of the inverted bucket 44 when steam enters the inverted bucket 44.

Next, a typical cycle of the steam trap 40 will be described. During typical operation of the steam trap 40, the steam trap cycles between two general positions: (1) the inverted bucket 44 not covering the outlet orifice 56 and at a lowered position (e.g., the same or similar to that of FIG. 2); and (2) the inverted bucket 44 at least partially covering the outlet orifice 56 and at a raised position (e.g., the same or similar to that of FIG. 5). When there is condensate and little or no steam in the bucket chamber 46, such that there is insufficient steam flow entering the bucket chamber 46 to cause the inverted bucket 44 to float and rise upward, the condensate, non-condensable gases (if any), and some steam (if any) are permitted to flow out of the outlet orifice 56 (see, e.g., position of inverted bucket 44 in FIG. 2). As the condensate is drained from the steam system by the steam trap 40, the amount of steam entering the bucket chamber 46 (i.e., entering inside the inverted bucket 44) increases compared to the amount of condensate entering the bucket chamber 46. This causes the amount of steam inside the inverted bucket 44 to increase, thereby causing the inverted bucket 44 to float and rise upward. The pressure differential between the steam in the inverted bucket 44, the steam exiting the vent hole 91, and fluid flow out of the outlet orifice 56 causes the inverted bucket 44 to be pulled against the interior sidewall 48 of the bucket chamber 46 at the location of the outlet orifice 56. As shown in FIG. 5 for example, the inverted bucket 44 pressing against the outlet orifice 56 causes the inverted bucket 44 to mostly cover, substantially cover, or even completely cover, the outlet orifice 56 so that the flow of fluid out of the outlet orifice 56 is blocked or at least hindered and reduced substantially. At this position, the amount of steam and condensate exiting the outlet orifice 56 is substantially reduced. The goal is to prevent or hinder the amount of steam exiting the outlet orifice 56 when the ratio of steam to condensate entering the steam trap 50 is greater than a certain level (determined at least in part by the weight of the inverted bucket 44 and the sizing of the vent hole 91 and the outlet orifice 56).

Then, as the ratio of condensate to steam entering the inverted bucket 44 increases (i.e., more condensate has built up at the inlet port 60 of the steam trap 40 over time), the amount of liquid in the bucket chamber 46 increases. As the liquid quantity in the bucket chamber 46 increases and the steam quantity in the bucket chamber 46 decreases, the amount of steam inside the inverted bucket 44 decreases (due to the vent hole 91). As this trend continues, at some point the weight of the inverted bucket 44 overcomes the buoyancy of the inverted bucket 44 (due to less steam inside the inverted bucket), and the movement of the fluid inside the bucket chamber 46 may help break the seal of the inverted bucket 44 covering the outlet orifice 56. At this point, the inverted bucket 44 begins to fall downward and away from the outlet orifice 56, thereby allowing fluid (condensate, non-condensable gases, and some steam) to flow out of the outlet orifice 56 again. This completes a cycle of the steam trap 40. This cycle is repeated again and again, as the steam trap 40 removes condensate from the steam system with preferably minimal or negligible steam loss.

Next with reference to FIGS. 6-11, some exemplary inverted bucket designs that may be incorporated into an embodiment of the present invention will be described. FIGS. 6 and 7 show an inverted bucket 44 of a second embodiment of the present invention. FIG. 7 is a cross-section view of the inverted bucket 44 of FIG. 6, as taken along line 7-7. In the second embodiment, the casing 42 and bucket chamber 46 may be the same as that of the first embodiment (see e.g., FIG. 2), for example. The vent hole 91 of the second embodiment is formed at an angle. In other words, as shown in FIG. 7, a vent hole angle θ between the vent hole axis 94 and a vertical plane that intersects the bucket axis 84 is about 45 degrees in the second embodiment. In an embodiment having an angled vent hole, it may be preferred to have a vent hole angle θ of at least 10 degrees. Because the vent hole 91 is angled, when fluid exits the vent hole 91, the fluid flow will be at an angle (as opposed to vertically). This causes a circumferential propulsion force vector acting on the inverted bucket 44, which thereby urges the inverted bucket 44 to rotate about the bucket axis 84. An advantage of causing the inverted bucket 44 to rotate is that the sealing surface of the inverted bucket 44 that presses against the outlet orifice 56 changes as the inverted bucket rotates. This may prevent excessive wear or erosion of just a single bucket surface portion or location over time because the sealing surface can be varied by the rotation of the inverted bucket 44. In other words, throughout numerous cycles of the steam trap 40, the rotation of the inverted bucket 44 within the bucket chamber 46 creates a greater number of surface portions of the inverted bucket 44 that will be used to seal or cover the outlet orifice 56. This may improve the reliability of the steam trap 40 and it may greatly increase the life of the steam trap. Furthermore, it may increase the amount of service time provided by the steam trap 40 before the amount of sealing provided at the outlet orifice 56 is reduced, thereby reducing the rate of decline of the ability of the inverted bucket 44 to seal or substantially cover the outlet orifice 56.

Figure 9:
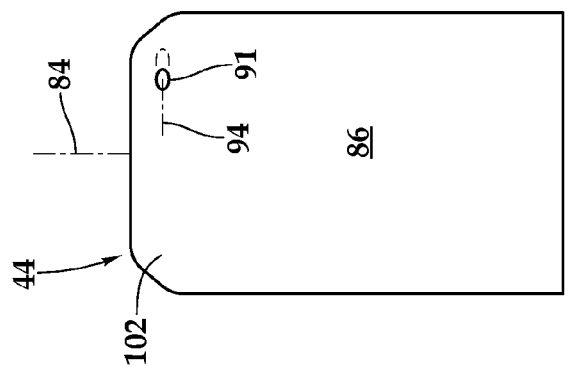
FIG. 9 is a side view of an inverted bucket of a fourth embodiment of the present invention.
Figure 8:
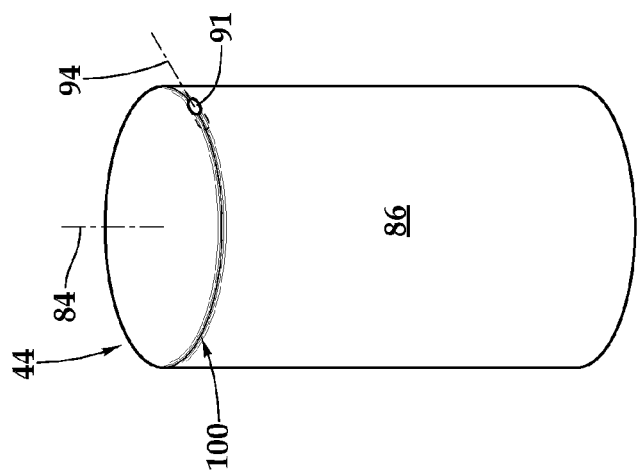
FIG. 8 is a perspective view of an inverted bucket of a third embodiment of the present invention.

FIG. 8 is a perspective view of an inverted bucket 44 of a third embodiment of the present invention. FIG. 9 is a side view of an inverted bucket 44 of a fourth embodiment of the present invention. In the third and fourth embodiments, the casing 42 and bucket chamber 46 may be the same as that of the first embodiment (see e.g., FIG. 2), for example. In the third and fourth embodiments, the vent holes 91 are also angled (e.g., vent hole angle θ relative to vertical plane passing through bucket axis 84 is greater than 10 degrees), similar to the second embodiment, but the shape of the inverted bucket 44 is varied and the placement of the vent hole 91 is varied (e.g., horizontal distance 96 relative to the bucket axis 84 is varied). In the third embodiment of FIG. 8, the inverted bucket 44 has rounded corners 100 where the sidewalls meet the top surface of the inverted bucket 44, and the vent hole 91 is formed on one of the rounded corners 100. In the fourth embodiment, the inverted bucket 44 has a beveled edge portion 102 where the sidewalls meet the top surface of the inverted bucket 44, and the vent hole 91 is formed on the beveled edge portion 102. The third and fourth embodiments further illustrate that the shape of the inverted bucket 44 may vary, as well as the placement of the vent hole 91, in an embodiment of the present invention.

Figure 10:
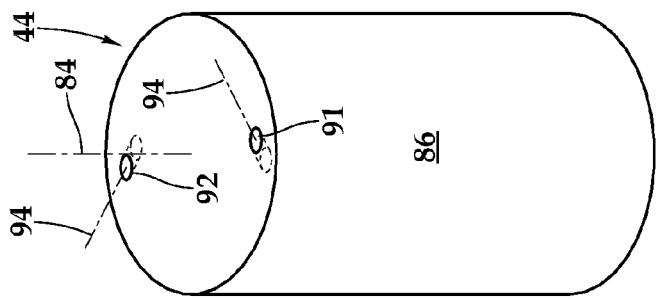
FIG. 10 is a perspective view of an inverted bucket of a fifth embodiment of the present invention.
Figure 11:
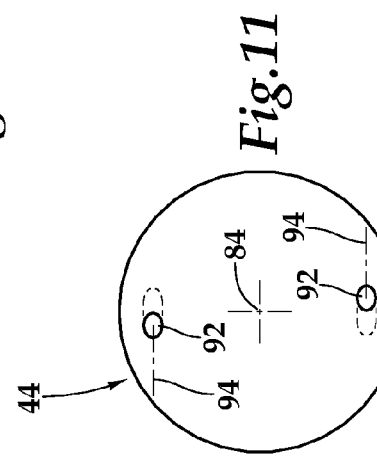
FIG. 11 is a top view of the inverted bucket of FIG. 10.

FIGS. 10 and 11 show an inverted bucket 44 for a fifth embodiment of the present invention. More specifically, FIG. 10 is a perspective view of the fifth embodiment inverted bucket 44, and FIG. 11 is a top view of the fifth embodiment inverted bucket 44. The inverted bucket 44 of the fifth embodiment is essentially the same as that of the second embodiment shown in FIGS. 6 and 7, except that there are two angled vent holes 91 and 92 rather than just one. In the fifth embodiment, the vent holes 91 and 92 are symmetric about the bucket axis 84 so that they provide the same rotation propulsion vector relative to the bucket axis 84. In other embodiments (not shown), the vent holes may not be symmetric about the bucket axis, even though symmetry is preferred here. Also, in other embodiments (not shown), there may be more than two vent holes.

The rotation of the inverted bucket 44 may affect the sealing cycle of the steam trap 40. It is contemplated that the rotation rate of the inverted bucket 44 (determined at least in part by the vent hole angle(s), the size of the vent hole(s), and the number of vent holes) may be varied to affect the steam trap cycle. Based on the teaching herein and the exemplary inverted bucket designs illustrated herein, one of ordinary skill in the art may select other vent hole configurations that fall within the spirit and scope of the claimed invention.

Although embodiments of the present invention and at least some of its advantages have been described in detail, it should be understood that various changes, substitutions, and alterations can be made herein without departing from the spirit and scope of the invention as defined by the appended claims. Moreover, the scope of the present application is not intended to be limited to the particular embodiments described in this specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A steam trap device comprising:
an inverted bucket having a generally cylindrical shaped outer portion extending along a bucket axis, the inverted bucket having a first vent hole formed in an upper portion thereof, the first vent hole being formed along a first vent hole axis;
a bucket chamber having an outlet orifice formed in a sidewall thereof, such that there is a spaced vertical distance between the outlet orifice and an upper interior surface of the bucket chamber, wherein the inverted bucket includes a flat upper surface,
wherein the inverted bucket is located within the bucket chamber so that the inverted bucket is free to move along the bucket axis within a vertical range of motion limited by the inverted bucket coming into contact with at least one interior surface of the bucket chamber,
wherein at least part of interior sidewalls of the bucket chamber are generally cylindrical shaped, such that the inverted bucket is free to pivot about the bucket axis within the bucket chamber, and such that the inverted bucket can move along a horizontal axis within a horizontal range of motion limited by the inverted bucket coming into contact with at least one sidewall interior surface of the bucket chamber, and
wherein the inverted bucket and the interior sidewalls of the bucket chamber are configured so that the inverted bucket is adapted to at least partially cover the outlet orifice when the inverted bucket is pulled against the interior sidewall of the bucket chamber at the location of the outlet orifice by a flow of fluid out of the outlet orifice; and
the bucket chamber having an inlet orifice formed in a lower portion thereof.

2. The steam trap device of claim 1, wherein a first vent hole angle between the first vent hole axis and a vertical plane that intersects the bucket axis is at least 10 degrees.

3. The steam trap device of claim 2, wherein the first vent hole angle is in a range between 10 degrees and 70 degrees.

4. The steam trap device of claim 1, wherein the bucket axis is vertical, the first vent hole is formed in a top surface of the inverted bucket, and the first vent hole axis is parallel with the bucket axis.

5. The steam trap device of claim 1, wherein the outlet orifice is formed along an outlet orifice axis, wherein an outlet orifice angle between the outlet orifice axis and a plane through a vertical axis is between about 45 degrees and about 135 degrees.

6. The steam trap device of claim 5, wherein the outlet orifice angle is 90 degrees.

7. The steam trap device of claim 1, wherein the inverted bucket is not attached to the bucket chamber.

8. The steam trap device of claim 1, the inverted bucket having a central body portion with a circular cross-section having a first diameter extending uniformly along the vertical axis, and at least part of the interior sidewalls of the bucket chamber are generally cylindrical shaped with a second diameter, wherein the second diameter is greater than the first diameter.

9. The steam trap device of claim 1, further comprising:
a metal cast casing comprising the bucket chamber, the outlet orifice, the inlet orifice, and an inlet passage extending downwardly to the inlet orifice, such that the inlet passage is fluidly coupled to the bucket chamber at least via the inlet orifice, wherein the bucket chamber, the outlet orifice, the inlet orifice, and the inlet passage are integrally cast in the casing; and an inlet pipe extending into the bucket chamber from the lower portion of the bucket chamber, such that the inlet pipe is located at least partially in the inverted bucket when the inverted bucket is at a lowest extent of the vertical range of motion, and such that the bucket chamber is fluidly coupled to the inlet orifice at least via the inlet pipe.

10. The steam trap device of claim 1, wherein the inverted bucket has a generally flat upper surface.

11. The steam trap device of claim 1, wherein the first vent hole is formed in a top surface of the inverted bucket.

12. The steam trap device of claim 1, wherein the first vent hole is formed in a side surface of the inverted bucket proximate to the top surface.

13. The steam trap device of claim 1, wherein the spaced vertical distance is in a range between about 5 percent and about 35 percent of an overall height of the bucket chamber.

14. The steam trap device of claim 1, wherein the inverted bucket comprises a mouthpiece ring portion at a main opening of the inverted bucket.

15. The steam trap device of claim 1, wherein the inverted bucket comprises a second vent hole formed therein opposite the first vent hole about the bucket axis.

16. The steam trap device of claim 1, wherein the bucket chamber is generally cylindrical shaped.

17. A steam trap device comprising:
an inverted bucket having a generally cylindrical shaped outer portion extending along a bucket axis,
the inverted bucket having a first vent hole formed in an upper portion thereof, the first vent hole being formed along a first vent hole axis, wherein a first vent hole angle between the first vent hole axis and a vertical plane that intersects the bucket axis is at least 10 degrees;
a bucket chamber having an outlet orifice formed in a sidewall thereof, such that there is a spaced vertical distance between the outlet orifice and an upper interior surface of the bucket chamber,
wherein the inverted bucket is located within the bucket chamber so that the inverted bucket is free to move along the bucket axis within a vertical range of motion limited by the inverted bucket coming into contact with at least one interior surface of the bucket chamber,
wherein at least part of interior sidewalls of the bucket chamber are generally cylindrical shaped, such that the inverted bucket is free to rotate about the bucket axis within the bucket chamber, and such that the inverted bucket can move along a horizontal axis within a horizontal range of motion limited by the inverted bucket coming into contact with at least one sidewall interior surface of the bucket chamber, and
wherein the inverted bucket and the interior sidewalls of the bucket chamber are configured so that the inverted bucket is adapted to cover the outlet orifice when the inverted bucket is pulled against the interior sidewall of the bucket chamber at the location of the outlet orifice by a flow of fluid out of the outlet orifice; and
the bucket chamber having an inlet orifice formed in a lower portion thereof.

18. The steam trap device of claim 17, wherein the first vent hole angle is about 45 degrees.

19. The steam trap device of claim 17, wherein the inverted bucket comprises a second vent hole formed therein opposite the first vent hole about the bucket axis.

20. A steam trap device comprising:
an inverted bucket having a generally cylindrical shape extending along a vertical axis, the inverted bucket having a central body portion with a circular cross-section having a first diameter extending uniformly along the vertical axis;
the inverted bucket having a first vent hole formed in an upper portion thereof, the first vent hole being formed along a first vent hole axis, wherein a first vent hole angle between the first vent hole axis and a vertical plane that intersects the vertical axis is at least 10 degrees;
a bucket chamber having a generally cylindrical interior shape;
the bucket chamber having an outlet orifice formed in a sidewall thereof, such that there is a spaced vertical distance between the outlet orifice and an upper interior surface of the bucket chamber, the outlet orifice being formed along an outlet orifice axis, wherein an outlet orifice angle between the outlet orifice axis and the vertical plane is between about 45 degrees and about 135 degrees,
wherein the inverted bucket is located within the bucket chamber but is not attached to the bucket chamber so that the inverted bucket is free to move along the vertical axis within a vertical range of motion limited by the inverted bucket coming into contact with at least one interior surface of the bucket chamber,
wherein at least part of interior sidewalls of the bucket chamber are generally cylindrical shaped with a second diameter, such that the inverted bucket is free to rotate about the vertical axis within the bucket chamber through a vertical distance range,
wherein the second diameter is greater than the first diameter such that the inverted bucket can move along a horizontal axis within a horizontal range of motion limited by the inverted bucket coming into contact with at least one sidewall interior surface of the bucket chamber, and
wherein the inverted bucket and the interior sidewalls of the bucket chamber are configured so that the inverted bucket is adapted to substantially cover the outlet orifice when the inverted bucket is pulled against the interior sidewall of the bucket chamber at the location of the outlet orifice by a flow of fluid out of the outlet orifice;
the bucket chamber having an inlet orifice formed in a lower portion thereof;
an inlet passage extending downwardly to the inlet orifice, such that the inlet passage is fluidly coupled to the bucket chamber at least via the inlet orifice; and
an inlet pipe extending into the bucket chamber from the lower portion of the bucket chamber, such that the inlet pipe is located at least partially in the inverted bucket when the inverted bucket is at a lowest extent of the vertical range of motion, and such that the bucket chamber is fluidly coupled to the inlet orifice at least via the inlet pipe.

* * * * *